UNITED STATES PATENT OFFICE.

WILLIAM F. NILES, OF JERSEY CITY, NEW JERSEY.

PROCESS OF MANUFACTURING BUTTONS AND OTHER ARTICLES FROM FIBROUS MATERIAL AND POWDERED HOOF.

SPECIFICATION forming part of Letters Patent No. 224,036, dated February 3, 1880.

Application filed December 29, 1879.

*To all whom it may concern:*

Be it known that I, WM. F. NILES, of Jersey City, county of Hudson, and State of New Jersey, have invented a certain new and useful Improvement in the Process of Manufacturing Buttons and other Articles from Fibrous Materials which will stand, without injury thereto, steam heat of 212° Fahrenheit and upward, and which invention is a special improvement on the invention for which Letters Patent were granted to me on the 18th day of November, A. D. 1879; and I do hereby declare that the following is a full, clear, and exact description of the same, sufficiently so to enable a person skilled in the art to which my said invention belongs to make and use the same.

The fibrous material is prepared in the same manner in every respect as described in my said Letters Patent No. 221,852, until it is ready to be inserted into the molds or dies, when about one-fourth part, by weight, of powdered hoof is stirred in in a thoroughly dry state, after which the fibrous material, intermixed with the dry powdered hoof, as before explained, is placed in the dies or molds and subjected to great pressure and heat at the same time, the heat being 212° Fahrenheit and upward, all as fully set forth in my said Letters Patent of November 18, A. D. 1879.

Articles formed from fibrous material having dry powdered hoof combined therewith, as before explained, will take a higher and more uniform polish than the articles manufactured according to my original invention, while the labor and expense of polishing are much lessened.

What I claim as my invention, and desire to secure by Letters Patent, is—

In the art of manufacturing articles from paper fibrous material, the mode or process hereinbefore described, consisting of, first, reducing the paper fibrous material to a pulp; second, drying the same; third, separating the dried pieces of pulp, by a saw or otherwise, into a soft linty substance or mass; fourth, then saturating such soft linty fibrous material with albumen or gelatine; fifth, drying the fibrous linty material thus saturated; sixth, breaking the dried saturated fibrous material up into small pieces or bunches; seventh, mixing dried powdered hoof, one-fourth part, by weight, with said broken dried saturated fibrous material; and, eighth, then placing said broken pieces of fibrous material, intermixed with dried powdered hoof, into molds of the desired shape, and then subjecting the same to great pressure, and at the same time to heat of 212° Fahrenheit and upward, for the purposes stated.

WILLIAM F. NILES.

Witnesses:
 THOS. H. DODGE,
 CHAS. D. GAY.